United States Patent
Edgren

(10) Patent No.: US 9,213,670 B2
(45) Date of Patent: Dec. 15, 2015

(54) METHOD AND USER INTERFACE SYSTEM OF A VEHICLE FOR PROVIDING AN ENERGY LEVEL GAUGE RELATIVE TO A VEHICLE RANGE METER

(71) Applicant: VOLVO CAR CORPORATION, Gothenburg (SE)

(72) Inventor: Claes Edgren, Trollhattan (SE)

(73) Assignee: Volvo Car Corporation, Gothenburg (SE)

( * ) Notice: Subject to any disclaimer, the term of this patent is extended or adjusted under 35 U.S.C. 154(b) by 30 days.

(21) Appl. No.: 14/159,936

(22) Filed: Jan. 21, 2014

(65) Prior Publication Data

US 2014/0214301 A1    Jul. 31, 2014

(30) Foreign Application Priority Data

Jan. 25, 2013    (EP) .................................... 13152611

(51) Int. Cl.
*G06F 15/00* (2006.01)
*B60K 37/02* (2006.01)
(Continued)

(52) U.S. Cl.
CPC ............... *G06F 15/00* (2013.01); *B60K 37/02* (2013.01); *B60L 11/1862* (2013.01); (Continued)

(58) Field of Classification Search
CPC ..... G06F 15/00; B60K 37/02; B60L 15/2045; B60L 11/1862; B60L 2260/54; B60L 2260/52; Y02T 10/705; Y02T 10/7283; Y02T 10/7005; Y02T 10/7044
USPC .......................................................... 701/99
See application file for complete search history.

(56) References Cited

U.S. PATENT DOCUMENTS

| 6,864,807 B2 | 3/2005 | Todoriki et al. |
| 7,237,203 B1 | 6/2007 | Kuenzner |

(Continued)

FOREIGN PATENT DOCUMENTS

| DE | 19959597 | 2/2001 |
| DE | 102008035460 | 5/2009 |
| EP | 1275936 | 1/2003 |

OTHER PUBLICATIONS

Volkswagen, Machine Translation of DE 102008035460 A1, May 14, 2009*
Extended European Search Report for EP 13152611.3, Completed by the European Patent Office on Jul. 1, 2013, 8 Pages.

*Primary Examiner* — Mary Cheung
*Assistant Examiner* — Frederick Brushaber
(74) *Attorney, Agent, or Firm* — Brooks Kushman P.C.

(57) ABSTRACT

A method is provided for graphic visualization of a propulsion energy level gauge relative to a vehicle range meter. A user interface system determines a current range of the vehicle based on a current remaining propulsion energy level of an energy storage device of the vehicle, and determines at least one hypothetical range of the vehicle based on at least one hypothetical level of remaining propulsion energy of the energy storage device. The graphic visualization is provided on a display, where the propulsion energy level gauge conveys the current remaining propulsion energy level and the hypothetical level of remaining propulsion energy, and the vehicle range meter conveys the current vehicle range and the hypothetical vehicle range. In the graphic visualization, the current remaining propulsion energy level is graphically associated with the current vehicle range, and the hypothetical level of remaining propulsion energy is graphically associated with the hypothetical vehicle range.

20 Claims, 2 Drawing Sheets

(51) Int. Cl.
*B60L 15/20* (2006.01)
*B60L 11/18* (2006.01)

(52) U.S. Cl.
CPC ........ *B60L 15/2045* (2013.01); *B60L 2260/52* (2013.01); *B60L 2260/54* (2013.01); *Y02T 10/7005* (2013.01); *Y02T 10/705* (2013.01); *Y02T 10/7044* (2013.01); *Y02T 10/7283* (2013.01)

(56) References Cited

U.S. PATENT DOCUMENTS

| | | | |
|---|---|---|---|
| 8,332,096 B2 * | 12/2012 | Riegelman et al. | 701/34.4 |
| 2012/0179318 A1 * | 7/2012 | Gilman et al. | 701/22 |
| 2012/0179420 A1 * | 7/2012 | Gilman et al. | 702/165 |

* cited by examiner

METHOD AND USER INTERFACE SYSTEM OF A VEHICLE FOR PROVIDING AN ENERGY LEVEL GAUGE RELATIVE TO A VEHICLE RANGE METER

CROSS-REFERENCE TO RELATED APPLICATIONS

This application claims foreign priority benefits under 35 U.S.C. §119(a)-(d) to European patent application number EP 13152611.3 filed Jan. 25, 2013, which is incorporated herein by reference in its entirety.

TECHNICAL FIELD

The present disclosure relates to a user interface system and a method performed therein for providing a graphic visualization of a propulsion energy level gauge relative to a vehicle range meter.

BACKGROUND

In order to provide a driver of a vehicle with information regarding said vehicle and e.g. the surroundings thereof, vehicles of today are commonly equipped with various gauges, indicators and information displays. For instance, a passenger car is typically provided with a gauge reflecting current level of fuel in the tank, or, should the vehicle be an electrically chargeable vehicle, level of remaining energy available for propulsion of the vehicle. A passenger car is furthermore additionally commonly provided with a trip computer function conveying an estimated vehicle range, which may consider e.g. current fuel level in combination with average fuel consumption. Valuable data related to fuel and range is thereby visualized, which may assist the driver in making choices related to for instance refueling and/or driving style.

US 2012/0179420, for instance, relates to graphically displaying vehicle range and destination information relative to each other and the vehicle location. A trip gauge is disclosed, which conveys vehicle trip information and vehicle range information graphically to assist drivers in qualitatively visualizing and determining whether they can successfully make it to their destination before an on-board source is depleted. Although the displayed information assists the driver in exercising economical driving, it does not, however, in an intuitive manner give the driver guidance to determine a suitable timing for refueling/recharging of the vehicle. That is, a question for the driver to consider, for instance when driving longer distances, commonly involve determining an appropriate timing when refueling/recharging may be desirable. Refueling/recharging the vehicle too soon may implicate that yet another refueling/recharging session may be necessary during the trip, which could have been avoided should refueling/recharging have been performed a bit later.

SUMMARY

It is therefore an object of embodiments herein to provide an improved way of assisting in an intuitive manner e.g. a driver of a vehicle in determining desirable timing of refueling/recharging of the vehicle.

According to a first aspect of embodiments herein, the object is achieved by a method performed by a user interface system of a vehicle for providing a graphic visualization of a propulsion energy level gauge relative to a vehicle range meter. The user interface system determines a current vehicle range of the vehicle based on a current remaining propulsion energy level of an energy storage device of the vehicle. The user interface furthermore determines at least one hypothetical vehicle range of the vehicle based on at least one hypothetical level of remaining propulsion energy of the energy storage device. Additionally, the user interface system provides the graphic visualization on a display, where the propulsion energy level gauge conveys the current remaining propulsion energy level and the hypothetical level of remaining propulsion energy, and the vehicle range meter conveys the current vehicle range and the hypothetical vehicle range. In the graphic visualization, the current remaining propulsion energy level is graphically associated with the current vehicle range, and the hypothetical level of remaining propulsion energy is graphically associated with the hypothetical vehicle range. Thereby, by combining the propulsion energy level gauge and the vehicle range meter in the graphic visualization such that the current remaining propulsion energy level is visually connected with the current vehicle range, and a hypothetical level of remaining propulsion energy is visually connected with a hypothetical vehicle range, an intuitive visualization of an estimated actual vehicle range relative the estimated actual energy level and an estimated fictive vehicle range relative the fictive level of energy, is provided. Accordingly, the e.g. driver may glance at the presented hypothetical vehicle range for consideration of a presumably desirable timing of refueling/recharging, without confusing said hypothetical vehicle range with the current vehicle range. For that reason, assisting in an intuitive manner e.g. the driver of a vehicle in determining desirable timing of refueling/recharging of the vehicle, has been improved.

Another advantage is that by providing the at least one hypothetical vehicle range, the driver may be made aware of a potential vehicle range should the vehicle be refueled/recharged at e.g. the current instant in time, given current propulsion energy conditions. That is, without the need to be knowledgeable of vehicle data such as e.g. current driving conditions and/or size of the fuel tank to name a few and perform tiresome calculations—which may prove to be non-trivial—to judge a suitable timing for refueling/recharging, the driver may merely glance at the hypothetical vehicle range of the graphical visualization to realize whether or not a current instant in time may be suitable for refueling/recharging or if waiting a bit further may be more desirable. Accordingly, the driver is hence assisted in avoiding refueling/recharging the vehicle too early, and subsequently in avoiding a potential additional refueling/recharging session before arriving at a presumed final destination, which could have been avoided should refueling/recharging have been performed a bit later.

The technical features and corresponding advantages of the above mentioned method will be discussed in further detail in the following.

By introducing a user interface system of a vehicle which provides a graphic visualization of a propulsion energy level gauge relative to a vehicle range meter, a view combining said gauge and said meter is presented to a potential user. Thereby, by combining the gauge and the meter in the same graphic visualization, the user may more easily interpret content associated with the gauge relative content associated with the meter. Said user is throughout this disclosure, for the sake of simplicity, referred to as the "driver" (of the vehicle), although the user likewise may refer to for instance a passenger of the vehicle or even a bystander. The referred to vehicle may be any engine-propelled vehicle, such as for instance a car, truck, lorry, van, bus, tractor, military vehicle, scooter, motorcycle, air plane, vessel such as e.g. a ship, and/or golf cart. Furthermore, said vehicle may be one of traditional vehicles, such as vehicles with internal combustion engines (ICEs), and/or electrical vehicles, i.e. electrically chargeable vehicles, such as for instance plug-in electrical vehicles (PEVs) and/or grid-enabled vehicles (GEVs) and/or battery electric vehicles (BEVs) e.g. using chemical energy stored in rechargeable battery packs, and/or hybrid electric vehicles using both electric motors and internal combustion engines which for instance are continually recharged with power from the internal combustion engine and/or regenerative braking, e.g. plug-in hybrid electric vehicles (PHEV) and/or range-extended electric vehicles (REEVs). So called new energy vehicles (NEVs) and/or neighborhood electric vehicles (NEVs) are likewise feasible. "Propulsion energy", in the following sometimes likewise referred to as merely "energy", is here intended to be interpreted to at least include fuel such as gasoline and diesel, and/or energy such as chemical energy e.g. stored in one or several rechargeable batteries (packs). Said rechargeable batteries may for instance be restored to partial or full charge by connection of a plug to an external electric power source, which e.g. may take place at a charging station and/or an electrical/power outlet.

By the user interface determining a current vehicle range of the vehicle based on a current remaining propulsion energy level of an energy storage device of the vehicle, a current remaining driving distance is estimated. Said determination may for instance be performed by means of a range determining unit comprised in any suitable electronic device, e.g. by one or several integrated arbitrary electronic control unit (ECU) nodes such as e.g. a cluster node, a display controller node or a main central node, either on-board or remotely. Furthermore, said determination may imply retrieving the current vehicle range and/or the current remaining propulsion energy level from implementations already available e.g. on-board the vehicle, the data of which may be provided for purposes other than those covered by this disclosure. Thereby, with the reuse of already available data, the user interface system may be implemented in a more efficient and cost effective manner. "Energy storage device" is here intended to be interpreted to at least include one or several, or a combination of, a fuel tank and at least one rechargeable battery (pack(s)). Furthermore, "based on" is throughout this disclosure intended to be interpreted to likewise include at least "utilizing", "considering" and "taking into account".

By the user interface determining at least one hypothetical vehicle range of the vehicle based on at least one hypothetical level of remaining propulsion energy of the energy storage device, at least one potential driving distance is estimated. Determination of the hypothetical vehicle range may be achieved similarly to the above described determination of the current vehicle range. "Hypothetical" level of remaining propulsion energy is here intended to define a potential, i.e. an imagined or fictive, remaining level of propulsion energy. Accordingly, by considering such an assumed fictive level of remaining propulsion energy, a fictive driving distance may subsequently be provided. The hypothetical level of remaining propulsion energy may for instance relate to a partial or full volume of a fuel tank, where said partial volume may be associated with dimensions of the tank such as e.g. ¼, ½ or ¾ thereof. Alternatively or additionally, the hypothetical level may for instance relate to a level or amount of e.g. chemical energy stored in the e.g. rechargeable battery (packs), which energy may be utilized for propulsion of the vehicle.

By the user interface system providing the graphic visualization on a display, where the propulsion energy level gauge conveys the current remaining propulsion energy level and the hypothetical level of remaining propulsion energy, and the vehicle range meter conveys the current vehicle range and the hypothetical vehicle range, the determined contents in question, i.e. energy levels of said gauge and ranges of said meter, are presented to the potential driver. "Display" is here intended to be interpreted in a broad manner, likewise including at least "screen". In some sense, the display need not necessarily be a digital display, but may even be represented by any suitable surface functioning as an information display for projecting the graphic visualization, e.g. a windscreen, or a head-up display. Furthermore, the display may alternatively and/or additionally to some extent comprise physical elements, such that the graphic visualization may comprise a combination of digital visualization and physical elements. For instance, the propulsion energy level gauge and/or the vehicle range meter may be represented by physical e.g. contours, outlines and/or indicators while visualization of e.g. vehicle range, hypothetical vehicle range, current remaining propulsion energy level and/or hypothetical level of remaining propulsion energy may be provided digitally. Furthermore, the display may be provided locally within the vehicle, for instance mounted thereto, or be comprised in e.g. a mobile or handheld electronic device. Additionally or alternatively, the display may be provided remotely. Accordingly, the field of implementation of the display may be arbitrary, and the display may for example be associated with an electronic device, which for instance may be stationary, portable, pocket-storable, hand-held, or vehicle-mounted such as an ECU. The electronic device may for instance be an arbitrary control unit, a mobile phone, a computer such as e.g. a laptop, a Personal Digital Assistant (PDA) or tablet computer, sometimes referred to as a surf plate, or an iPad.

In the graphic visualization, with the current remaining propulsion energy level being graphically associated with the current vehicle range, and the hypothetical level of remaining propulsion energy being graphically associated with the hypothetical vehicle range, an intuitive view with the current energy level being visually connected with the current range and the hypothetical energy level being visually connected with the hypothetical range, is presented to the potential driver. Thereby, a user-friendly visualization of the estimated actual range and the at least one estimated fictive range is displayed, in which the driver easily may distinguish the current range and/or current energy level from the hypothetical range(s) and/or hypothetical energy level(s). Accordingly, the risk of the driver mixing up current values with hypothetical values, and thus subsequently e.g. risking accidentally emptying the energy storage device, may be reduced or even avoided. "Graphically associated" is here intended to be interpreted to at least likewise include "visually connected", "positioned directly adjacent", "graphically aligned", and "matched color-wise".

According to an embodiment, the user interface system may further determine the current vehicle range and/or determine the hypothetical vehicle range additionally based on consumption influencing conditions affecting propulsion energy consumption of the vehicle. Thereby, not only is the estimated actual energy level and/or the fictive energy level considered when determining, respectively, the estimated actual range and/or fictive range, but additionally further conditions which affect the energy consumption. This subsequently implies that more accurately predicted ranges may be determined. Determination of the current range and/or hypothetical range when additionally based on consumption influencing conditions may be achieved similarly to the above described determination of the current vehicle range.

According to a further embodiment, the consumption influencing conditions comprise one or a combination of estimated propulsion energy consumption associated with previous, current, and/or predicted driving conditions of the vehicle, temperature of the energy storage device, and/or power consumption of surrounding power consumers utilizing energy from the energy storage device. That is, the consumption influencing conditions may comprise estimated energy consumption associated with driving conditions, which driving conditions for instance may relate to a previous or current driving profile or driving habit of the driver, i.e. an energy consumption profile, such as how he or she accelerates, brakes and utilizes the gear shift, and/or speed profile of the vehicle, such as average speed, idle running, and/or acceleration. With regards to predicted driving conditions, estimated energy consumption may be based on assumed driving conditions, for instance based on historical data or calculations, related to e.g. geographical conditions of where the vehicle presumably is heading. As previously indicated, consumption influencing conditions may be retrieved locally from electronic units on-board the vehicle, or be wirelessly retrieved from a remote location. The latter may be relevant specifically for consumption influencing conditions related to predicted driving conditions, e.g. when the vehicle is approaching a city and an expected traffic jam, the data of which may be derived for instance from broadcasted traffic information and/or positioning data e.g. retrieved from GPS. Additionally, especially in case of electrically chargeable vehicles, temperature of the energy storage device may influence the estimated propulsion energy consumption. The temperature of the energy storage device, such as e.g. the battery pack(s), may for instance be affected by ambient temperature, acceleration, and/or period of recharging time of the energy storage device. Furthermore, again especially in case of electrically chargeable vehicles, the estimated energy consumption may be influenced by power consumption of surrounding power consumers utilizing energy from the energy storage device. Said surrounding power consumers may for instance involve vehicle lighting, heating and/or cooling, which may consume energy which otherwise could have been utilized for propulsion of the vehicle.

According to yet a further embodiment, the user interface system may further continuously adapt the graphic visualization based on the consumption influencing conditions. Thereby, the contents of the propulsion energy level gauge and/or vehicle range meter may change dynamically with changing consumption influencing conditions. Naturally, in addition or alternatively to adapting the graphic visualization based on the consumption influencing conditions, the contents of said gauge and said meter may be updated based on the changing level of energy in the energy storage tank. "Continuously" adapting is here intended to be interpreted in a broad manner, whereby the frequency with which the graphic visualization may be adapted hence may vary with the implementation at hand. Accordingly, such frequency may thus for instance range from adaptation once every few seconds to once every few minutes. Furthermore, adapting the graphic visualization need not necessarily be time-dependent, but may likewise be additionally and/or alternatively event-dependent, thus triggered for instance by a change of acceleration. "Adapting" is here intended to be interpreted to likewise include at least "adjusting", "refining", "modifying" and "conforming". The user interface system may adapt the graphic visualization for instance based on calculations performed locally or remotely.

According to another embodiment, the hypothetical level of remaining propulsion energy may be associated with full capacity of the energy storage device, and/or a predeterminable portion of the capacity of the energy storage device. Thereby, one or several capacity levels of the energy storage device may be selected to represent the hypothetical energy level. Full capacity of the storage device may for instance refer to a full fuel tank, and/or fully charged battery (pack(s)), while a portion of the capacity for instance may refer to a partial volume of e.g. said fuel tank, and/or level of energy stored in said e.g. rechargeable battery.

According to yet another embodiment, in the graphic visualization, the current remaining propulsion energy level may be represented by an energy level indicator, the hypothetical level of remaining propulsion energy by an indicator of hypothetical energy level, the current vehicle range by a range indicator, and the hypothetical vehicle range by an indicator of hypothetical range. Thereby, indicators are introduced which may assist the potential driver in more easily perceiving the contents of the propulsion energy level gauge and the vehicle range meter. The range indicator and/or the indicator of hypothetical range may, respectively, for instance comprise an end marking, and/or a marking e.g. having the design of being an end section of a bar or extension, which may be e.g. dashed or dotted, the length of which may vary with the values of the ranges, and the respective markings e.g. having different colors, patterns and/or intensity to more easily distinguish one from the other. The energy level indicator and/or the indicator of hypothetical energy level may, respectively, for instance likewise comprise a marking, e.g. having the design of a needle, indicating the estimated actual energy level and/or the fictive energy level. According to a further embodiment, the indicator of hypothetical energy level may comprise an intuitive indication, for instance one of a combination of an explanatory symbol(s), letter(s), marking(s), numerical character(s) and/or text. Thereby, the potential driver may even more easily perceive the intention of the hypothetical level of remaining propulsion energy, and more easily distinguish the indicator of hypothetical energy level from the energy level indicator. Said intuitive indication is for instance represented by a symbol which brings to mind a full or partially full fuel tank and/or (propulsion) battery, e.g. having the design of a filled, or partially filled, body. In the case of electrically chargeable vehicles specifically, the intuitive indication may additionally or alternatively e.g. comprise a numerical value indicating a period of a recharging time of the energy storage device. Thereby, the indicator of hypothetical vehicle range may in an intuitive manner indicate the fictive vehicle range, should the energy storage device given current conditions be recharged the period of recharging time indicated by the given number value. According to yet a further embodiment, in the graphic visualization, the propulsion energy level gauge may comprise a bar graph, an end position of a first bar of the bar graph comprising the energy level indicator, and/or an end position of a second bar of the bar graph comprising the indicator of the hypothetical energy level. Thereby, by introducing said gauge to comprise such first and/or second bar graph, an essentially self-explanatory view of the gauge, the energy level indicator and/or the indicator of hypothetical energy level is provided. The first and second bar graphs may for instance be of different width, have different filling density, pattern, colors and/or intensity, to facilitate distinguishing the current remaining propulsion energy level from the hypothetical level of remaining propulsion energy.

According to a further embodiment, the energy level indicator may be graphically aligned with the range indicator, and/or the indicator of hypothetical energy level may be graphically aligned with the indicator of hypothetical range. Thereby, the indicators conveying estimated actual energy level and range, and/or the indicators conveying fictive energy level and range, are respectively visually connected such that a potential driver in an intuitive manner easily may perceive the current vehicle range relative the current remaining propulsion energy level, and/or the hypothetical vehicle range relative the hypothetical level of remaining propulsion energy, and furthermore easily distinguish them from one another. As previously mentioned, "visually connected" is here intended to be interpreted to at least likewise include "graphically associated", "positioned directly adjacent", "graphically aligned", and "matched color-wise".

According to another embodiment, the range indicator and/or the indicator of hypothetical vehicle range may, respectively, comprise distance indications of the current vehicle range and/or the hypothetical vehicle range, for instance specified in meters, kilometres and/or miles. Thereby, by providing such distance indications, numerical values may assist the potential driver in perceiving the current vehicle range and/or hypothetical vehicle range. To further distinguish the estimated actual range from the estimated fictive range, the distance indications of the latter may for instance be provided in parenthesis, be of a different color and/or intensity, and/or have different font, font size and/or font thickness.

According to another embodiment, the energy storage device may be rechargeable, which energy storage device for instance may comprise at least one rechargeable battery. Thereby, rechargeable vehicles which e.g. may have limited range and for which recharging strategy and range anxiety— i.e. the fear that the vehicle has insufficient range to reach its destination—may be of major concern, are targeted by the scope of this disclosure.

According to a further embodiment, the hypothetical level of remaining propulsion energy may be based on the current remaining propulsion energy level in combination with a selectable recharging unit of the energy storage device, for instance a selectable period of recharging time. Thereby, should the vehicle be e.g. electrically rechargeable, a fictive range based on current estimated actual level of energy in the energy storage device summed up with hypothetical added energy estimated to be obtained by recharging the energy storage device e.g. the selected period of time, may be provided. The selectable period of time may for instance be one out of several predetermined periods of time, such as e.g. 5, 10, 15, 20 minutes and so forth. Alternatively or additionally, the selectable recharging unit may refer to e.g. a selectable monetary value which may be associated with a specific period of recharging time. Such an association between a monetary value and a specific period of recharging time may for instance be stored locally on-board the vehicle, or retrieved wirelessly from e.g. nearby charging stations. The selectable recharging unit, such as e.g. the selectable period of recharging time, may for instance be user-selectable. Furthermore, additionally or alternatively, said unit may be a selectable dynamic value.

According to a second aspect of embodiments herein, the object is achieved by a user interface system of a vehicle for providing a graphic visualization of a propulsion energy level gauge relative to a vehicle range meter. The user interface system comprises a range determining unit for determining a current vehicle range of the vehicle based on a current remaining propulsion energy level of an energy storage device of the vehicle, and for determining at least one hypothetical vehicle range of the vehicle based on at least one hypothetical level of remaining propulsion energy of the energy storage device. The user interface system further comprises a display for providing the graphic visualization, where the propulsion energy level gauge conveys the current remaining propulsion energy level and the hypothetical level of remaining propulsion energy, and the vehicle range meter conveys the current vehicle range and the hypothetical vehicle range. In the graphic visualization, the current remaining propulsion energy level is visually associated with the current vehicle range, and the hypothetical level of remaining propulsion energy is visually associated with the hypothetical vehicle range. Similar advantages as those mentioned in the foregoing correspondingly apply, why these are not further discussed.

According to a third aspect of embodiments herein, the object is achieved by a vehicle comprising the user interface system previously mentioned, where the display is provided in the vehicle, and may be comprised in an instrument panel, a center stack, a cluster, a wind screen and/or a dashboard of the vehicle. Yet again, similar advantages as those mentioned in the foregoing correspondingly apply, why these are not further discussed.

It should be understood that said method of providing the graphic visualization may require the vehicle to be in, for instance, an idle or a running state.

BRIEF DESCRIPTION OF THE DRAWINGS

The various aspects of the non-limiting embodiments of the disclosure, including particular features and advantages, will be readily understood from the following detailed description and the accompanying drawings, in which.

DETAILED DESCRIPTION

As required, detailed embodiments of the present disclosure are disclosed herein. However, it is to be understood that the disclosed embodiments are merely exemplary of the disclosure that may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

In the following, according to embodiments herein which relate to providing a graphic visualization of a propulsion energy level gauge relative to a vehicle range meter, there will be disclosed an intuitive visualization of an estimated actual vehicle range relative an estimated actual energy level, and an estimated fictive vehicle range relative a fictive level of energy.

Figure 1:
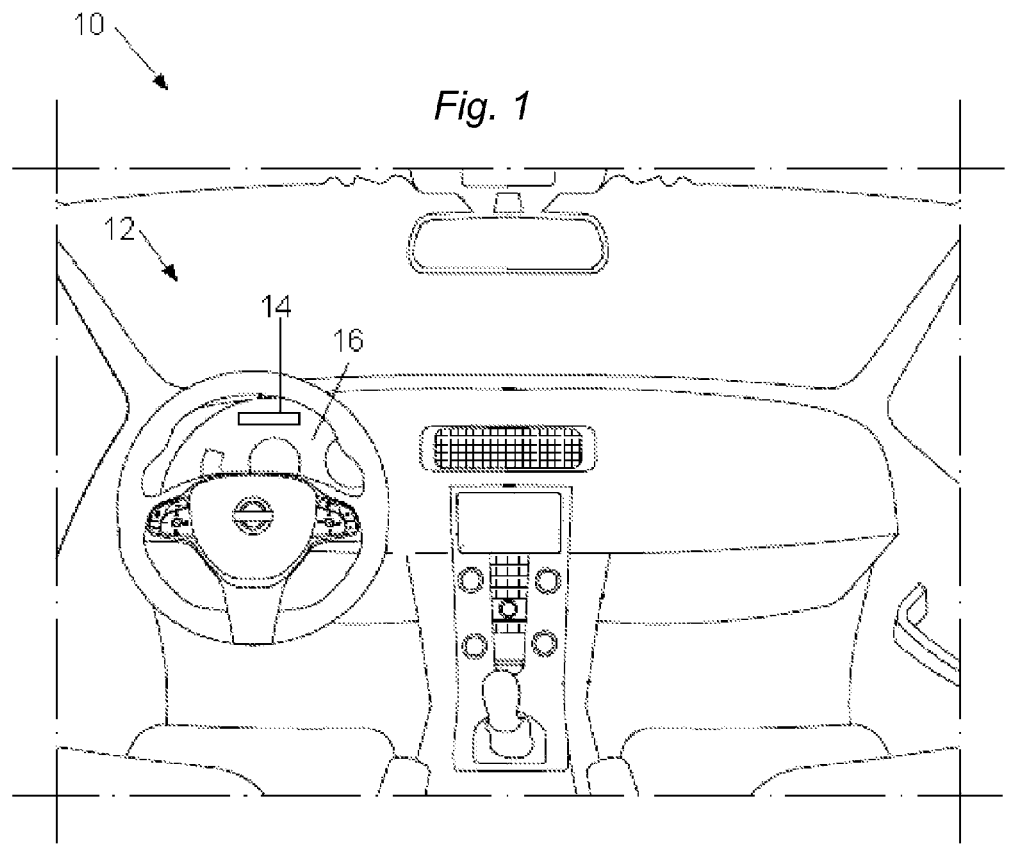
FIG. 1 illustrates an exemplifying vehicle comprising a user interface system for providing a graphic visualization of a propulsion energy level gauge relative to a vehicle range meter according to embodiments of the disclosure.

Referring now to the figures and FIG. 1 in particular, there is depicted an exemplifying vehicle 10 comprising a user interface system 12 for providing a graphic visualization of a propulsion energy level gauge relative to a vehicle range meter according to embodiments of the disclosure. The user interface system 12 comprises a display 14, and the display 14 is here provided in the vehicle 10, more specifically comprised in an instrument panel 16 thereof. The vehicle 10 is according to the shown embodiment of FIG. 1 an electrically chargeable passenger car. The vehicle 10 comprises an energy storage device (not illustrated) which in turn comprises energy utilizable for propulsion of the vehicle 10. The energy storage device is here rechargeable, with the energy storage device comprising at least one rechargeable battery.

Figure 2:
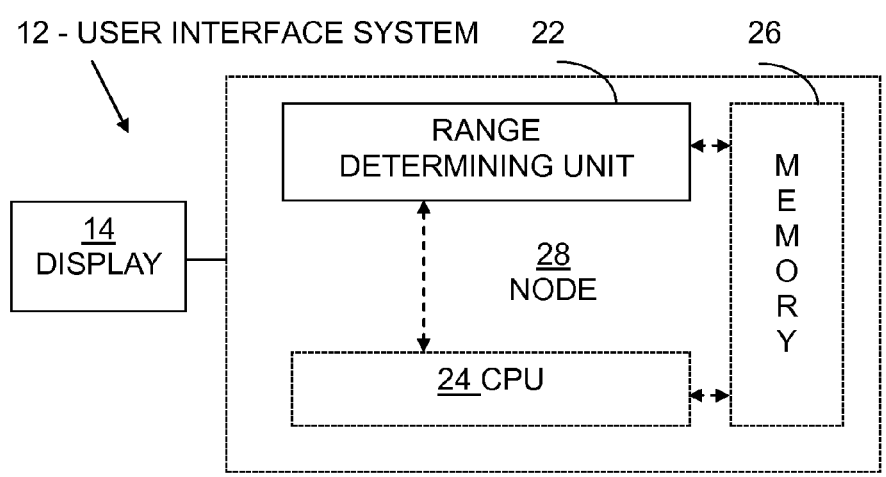
FIG. 2 is a schematic block diagram illustrating a user interface system according to embodiments of the disclosure.

As further shown in FIG. 2, which depicts a schematic block diagram illustrating a user interface system 12 according to embodiments of the disclosure, the user interface 12 additionally comprises a range determining unit 22. Furthermore, the embodiments herein for providing a graphic visualization of a propulsion energy level gauge relative to a vehicle range meter may be implemented through one or more processors, such as a processor 24, together with computer program code for performing the functions and actions of the embodiments herein. Said program code may also be provided as a computer program product, for instance in the form of a data carrier carrying computer program code for performing the embodiments herein when being loaded into the user interface system 12. One such carrier may be in the form of a CD ROM disc. It is however feasible with other data carriers such as a memory stick. The computer program code may furthermore be provided as pure program code on a server and downloaded to the user interface system 12. The user interface system 12 may further comprise a memory 26 comprising one or more memory units. The memory 26 may be arranged to be used to store e.g. information, and further to store data, configurations, schedulings, road maps and applications, to perform the methods herein when being executed in the user interface system 12. The processor 24, the memory 26, and the range determining unit 22 may for instance be implemented in one or several arbitrary nodes 28, arranged locally on-board the vehicle, remotely, or a combination thereof. Said node 28 may be an electronic control unit (ECU) or any suitable generic electronic device, and may involve one or a combination of for instance a cluster node, a display controller node and/or a main central node. Those skilled in the art will also appreciate that the range determining unit 22 described above may refer to a combination of analog and digital circuits, and/or one or more processors configured with software and/or firmware, e.g. stored in a memory such as the memory 26, that when executed by the one or more processors such as the processor 24 perform as will be described in more detail later on in this description. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 3:
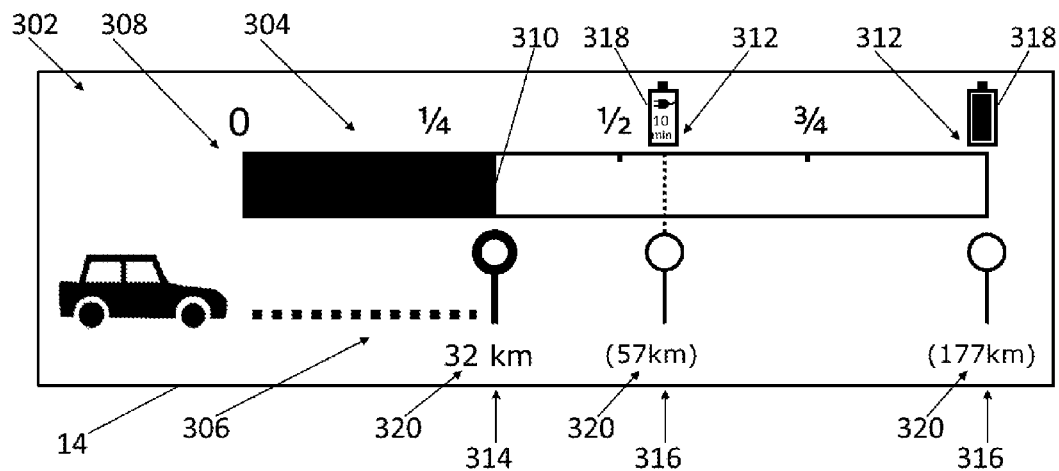
FIG. 3 shows an exemplifying graphic visualization of a propulsion energy level gauge relative to a vehicle range meter according to embodiments of the disclosure.

FIG. 3 shows an exemplifying graphic visualization 302 of a propulsion energy level gauge 304 relative to a vehicle range meter 306 according to embodiments of the disclosure. Here, a current remaining propulsion energy level of the energy storage device is represented by an energy level indicator 310, and hypothetical levels of remaining propulsion energy of the energy storage device by indicators of hypothetical energy level 312. Furthermore, a current vehicle range of the vehicle 10 is represented by a range indicator 314, and hypothetical vehicle ranges of the vehicle 10 by indicators of hypothetical range 316. The propulsion energy level gauge 304 does here comprise a bar graph 308, an end position of a bar of the bar graph comprising the energy level indicator 310. In the shown exemplifying embodiment of FIG. 3, the energy level indicator 310 is graphically aligned with the range indicator 314, and each of the indicators of hypothetical energy level 312 are graphically aligned with the corresponding indicator of hypothetical range 316.

Each indicator of hypothetical energy level 312 comprises an intuitive indication 318, here implemented as an explanatory symbol depicted to resemble a battery, and for the leftmost intuitive indication 318, combined with numerical characters indicating a period of fictive recharging time. Additionally, in the shown example, the range indicator 314 and each indicator of hypothetical vehicle range 316 respectively comprise distance indications 320 of the current vehicle range and the hypothetical vehicle ranges, here specified in kilometres. To further distinguish the distance indication 320 associated with the current vehicle range from the distance indications 320 associated with the hypothetical vehicle ranges, the numerical distance indications 320 related to the latter are furthermore provided in parenthesis.

According to the exemplifying embodiment shown in FIG. 3, the hypothetical level of remaining propulsion energy is associated with full capacity of the energy storage device, here a fully charged battery, and a predeterminable portion of the capacity of the energy storage device, here a 10 minute period of recharging time. Furthermore, the hypothetical level of remaining propulsion energy is according to the exemplifying embodiment of FIG. 3 based on the current remaining propulsion energy level, here the remaining (propulsion) battery capacity, in combination with a selectable recharging unit of the energy storage device, more specifically a selectable period of recharging time of the energy storage device. Such a selectable period of time here refers to the indicator of hypothetical energy level 312 associated with the previously mentioned recharging time of 10 minutes, as indicated by the leftmost intuitive indication 318.

Figure 4:
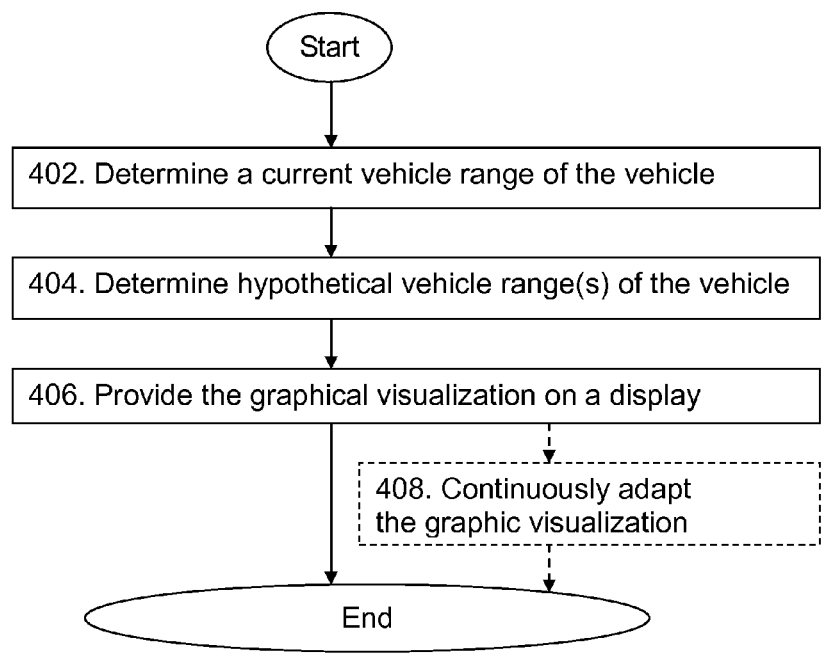
FIG. 4 is a flowchart depicting an exemplifying method for providing a graphic visualization of a propulsion energy level gauge relative to a vehicle range meter according to embodiments of the disclosure.

FIG. 4 is a flowchart depicting an exemplifying method for providing a graphic visualization of a propulsion energy level gauge relative to a vehicle range meter according to embodiments of the disclosure. The exemplifying method, which may be continuously repeated, comprises the following actions discussed with support from FIGS. 1-3. The actions may be taken in any suitable order.

Action 402

In Action 402, the user interface system 12 determines, e.g. by means of the range determining unit 22, the current vehicle range of the vehicle 10 based on the current remaining propulsion energy level of the energy storage device of the vehicle 10.

Action 404

In Action 404, the user interface system 12 determines, e.g. by means of the range determining unit 22, at least one hypothetical vehicle range of the vehicle 10 based on at least one hypothetical level of remaining propulsion energy of the energy storage device.

Action 406

In Action 406, the user interface system 12 provides the graphic visualization 302 on the display 14, where the propulsion energy level gauge 304 conveys the current remaining propulsion energy level and the at least one hypothetical level of remaining propulsion energy, and the vehicle range meter 306 conveys the current vehicle range and the at least one hypothetical vehicle range. In the graphic visualization 302, as previously discussed, the current remaining propulsion energy level is graphically associated with the current vehicle range, and the at least one hypothetical level of remaining propulsion energy is graphically associated with the hypothetical vehicle range.

Action 408

Determination of the current vehicle range and/or the at least one hypothetical vehicle range may additionally be based on consumption influencing conditions affecting propulsion energy consumption of the vehicle 10. Accordingly, in optional Action 408, the user interface system 12 may continuously adapt the graphic visualization 302 based on the consumption influencing conditions. The consumption influencing conditions may for instance comprise one or a combination of estimated propulsion energy consumption associated with previous, current, and/or predicted driving conditions of the vehicle 10, temperature of the energy storage device, and/or power consumption of surrounding power consumers utilizing energy from the energy storage device.

Consequently, the provision of the graphic visualization 302 as described in the foregoing may thus enable the driver to merely cast a glance at the presented hypothetical vehicle ranges—which in FIG. 3 are represented by the indicators of hypothetical vehicle range 316 comprising the distance indications 320—for consideration of a presumably desirable timing of refueling/recharging, without confusing the hypothetical vehicle ranges with the current vehicle range, which in FIG. 3 is represented by the range indicator 314.

The person skilled in the art realizes that the present disclosure by no means is limited to the embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method performed by a user interface system of a vehicle for providing a graphic visualization of a propulsion energy level gauge relative to a vehicle range meter, said method comprising:
   determining a current vehicle range of said vehicle based on a current remaining propulsion energy level of an energy storage device of said vehicle;
   determining at least one hypothetical vehicle range of said vehicle based on at least one hypothetical level of remaining propulsion energy of said energy storage device, said hypothetical level of remaining propulsion energy indicating a fictive level should said energy storage device be refueled or recharged at a predetermined instant in time; and
   providing said graphic visualization on a display, said propulsion energy level gauge conveying said current remaining propulsion energy level and said hypothetical level of remaining propulsion energy, and said vehicle range meter conveying said current vehicle range and said hypothetical vehicle range,
   wherein, in said graphic visualization, said current remaining propulsion energy level is graphically associated with said current vehicle range, and said hypothetical level of remaining propulsion energy is graphically associated with said hypothetical vehicle range.

2. The method in accordance with claim 1, wherein determining the current vehicle range or determining the hypothetical vehicle range additionally is based on consumption influencing conditions affecting propulsion energy consumption of said vehicle.

3. The method in accordance with claim 2, wherein said consumption influencing conditions comprise one or a combination of temperature of said energy storage device, power consumption of surrounding power consumers utilizing energy from said energy storage device, and estimated propulsion energy consumption associated with previous, current, or predicted driving conditions of said vehicle.

4. The method in accordance with claim 2 further comprising continuously adapting said graphic visualization based on said consumption influencing conditions.

5. The method in accordance with claim 1 wherein said hypothetical level of remaining propulsion energy is associated with full capacity of said energy storage device, or a predeterminable portion of the capacity of said energy storage device.

6. The method in accordance with claim 1 wherein, in said graphic visualization, said current remaining propulsion energy level is represented by an energy level indicator, said hypothetical level of remaining propulsion energy by an indicator of hypothetical energy level, said current vehicle range by a range indicator, and said hypothetical vehicle range by an indicator of hypothetical range.

7. The method in accordance with claim 6 wherein said energy level indicator is visually connected, graphically associated, positioned adjacent, graphically aligned, matched color-wise or graphically inter-related, with said range indicator, or wherein said indicator of hypothetical energy level is visually connected, graphically associated, positioned adjacent, graphically aligned, matched color-wise or graphically inter-related, with said indicator of hypothetical range.

8. The method in accordance with claim 6 wherein said indicator of hypothetical energy level comprises an intuitive indication of at least on of an explanatory symbol(s), letter(s), marking(s), numerical character(s) and text.

9. The method in accordance with claim 6 wherein said range indicator comprises a distance indication of said current vehicle range in meters, kilometers or miles, or said indicator of hypothetical vehicle range comprises a distance indication of said hypothetical vehicle range in meters, kilometers or miles.

10. The method in accordance with claim 6 wherein, in said graphic visualization, said propulsion energy level gauge comprises a bar graph, an end position of a first bar of said bar graph comprising said energy level indicator, or an end position of a second bar of said bar graph comprising said indicator of said hypothetical energy level.

11. The method in accordance with claim 1 wherein said energy storage device is rechargeable, such as at least one rechargeable battery.

12. The method in accordance with claim 11, wherein said hypothetical level of remaining propulsion energy is based on said current remaining propulsion energy level in combination with a selectable recharging unit of said energy storage device such as a selectable period of recharging time.

13. A user interface system of a vehicle for providing a graphic visualization of a propulsion energy level gauge relative to a vehicle range meter, said user interface system comprising:
   a range determining unit for determining a current vehicle range of said vehicle based on a current remaining propulsion energy level of an energy storage device of said vehicle, and for determining at least one hypothetical vehicle range of said vehicle based on at least one hypothetical level of remaining propulsion energy of said energy storage device, said hypothetical level of remaining propulsion energy indicating a fictive level should said energy storage device be refuelled; or recharged at a predetermined instant in time; and a display for providing said graphic visualization, said propulsion energy level gauge conveying said current remaining propulsion energy level and said hypothetical level of remaining propulsion energy, and said vehicle range meter conveying said current vehicle range and said hypothetical vehicle range;

wherein, in said graphic visualization, said current remaining propulsion energy level is visually associated with said current vehicle range, and said hypothetical level of remaining propulsion energy is visually associated with said hypothetical vehicle range.

14. A vehicle comprising the user interface system in accordance with claim 13, wherein said display is provided in said vehicle, and comprised in at least one of an instrument panel, a center stack, a cluster, a wind screen and a dashboard of said vehicle.

15. The user interface system in accordance with claim 13 wherein said energy storage device is rechargeable, such as at least one rechargeable battery, and wherein said hypothetical level of remaining propulsion energy is based on said current remaining propulsion energy level in combination with a selectable recharging unit of said energy storage device such as a selectable period of recharging time.

16. A method performed by a user interface system of a vehicle for providing a graphic visualization of a propulsion energy level gauge relative to a vehicle range meter, said method comprising:

determining a current vehicle range of said vehicle based on a current remaining propulsion energy level of an energy storage device of said vehicle;

determining at least one hypothetical vehicle range of said vehicle based on at least one hypothetical level of remaining propulsion energy of said energy storage device, said hypothetical level of remaining propulsion energy indicating a fictive level should said energy storage device be refueled or recharged at a predetermined instant in time; and providing said graphic visualization on a display, said propulsion energy level gauge conveying said current remaining propulsion energy level and said hypothetical level of remaining propulsion energy, and said vehicle range meter conveying said current vehicle range and said hypothetical vehicle range;

wherein, in said graphic visualization, said current remaining propulsion energy level is graphically associated with said current vehicle range, and said hypothetical level of remaining propulsion energy is graphically associated with said hypothetical vehicle range, wherein said energy storage device is rechargeable, such as at least one rechargeable battery, and wherein said hypothetical level of remaining propulsion energy is based on said current remaining propulsion energy level in combination with a selectable recharging unit of said energy storage device such as a selectable period of recharging time.

17. The method in accordance with claim 16 wherein determining the current vehicle range or determining the hypothetical vehicle range additionally is based on consumption influencing conditions affecting propulsion energy consumption of said vehicle.

18. The method in accordance with claim 17 wherein said consumption influencing conditions comprise one or a combination of temperature of said energy storage device, power consumption of surrounding power consumers utilizing energy from said energy storage device, and estimated propulsion energy consumption associated with previous, current, or predicted driving conditions of said vehicle.

19. The method in accordance with claim 17 further comprising continuously adapting said graphic visualization based on said consumption influencing conditions.

20. The method in accordance with claim 16 wherein said hypothetical level of remaining propulsion energy is associated with full capacity of said energy storage device, or a predeterminable portion of the capacity of said energy storage device.

\* \* \* \* \*

UNITED STATES PATENT AND TRADEMARK OFFICE
CERTIFICATE OF CORRECTION

| | | |
|---|---|---|
| PATENT NO. | : 9,213,670 B2 | Page 1 of 1 |
| APPLICATION NO. | : 14/159936 | |
| DATED | : December 15, 2015 | |
| INVENTOR(S) | : Claes Edgren et al. | |

It is certified that error appears in the above-identified patent and that said Letters Patent is hereby corrected as shown below:

Claims

Column 12, Line 40, Claim 8:

After "indicate of at least"
Delete "on" and
Insert -- one --.

Signed and Sealed this
Twenty-ninth Day of March, 2016

Michelle K. Lee
*Director of the United States Patent and Trademark Office*